United States Patent [19]

Ono et al.

[11] Patent Number: 4,799,127

[45] Date of Patent: Jan. 17, 1989

[54] SEMICONDUCTIVE CERAMIC COMPOSITION AND SEMICONDUCTOR CERAMIC CAPACITOR

[75] Inventors: Shuichi Ono; Shuichi Itagaki; Masahiro Yahagi; Kiyoshi Furukawa; Shinobu Fujiwara; Yasunobu Oikawa, all of Akita, Japan

[73] Assignee: TDK Corporation, Nihonbashi, Japan

[21] Appl. No.: 79,018

[22] Filed: Jul. 29, 1987

[30] Foreign Application Priority Data

Jul. 29, 1986 [JP] Japan ............................. 61-176632
Jul. 29, 1986 [JP] Japan ............................. 61-176633

[51] Int. Cl.$^4$ ..................... H01G 4/10; C04B 41/14; H01B 3/02
[52] U.S. Cl. ................................. 361/321; 501/136; 264/61
[58] Field of Search ............... 252/62.3 ZB, 62.3 BT, 252/62.3 GA; 501/134, 135, 136; 264/61; 427/79, 80; 361/320, 321, 308-310

[56] References Cited

U.S. PATENT DOCUMENTS

| | | | |
|---|---|---|---|
| 3,637,435 | 1/1972 | Schwyn et al. | 264/61 X |
| 3,933,668 | 1/1976 | Takahashi et al. | 501/136 |
| 4,511,601 | 4/1985 | Akse et al. | 427/79 |
| 4,567,059 | 1/1986 | Yamaoka et al. | 427/79 |

FOREIGN PATENT DOCUMENTS

| | | | |
|---|---|---|---|
| 2839976 | 3/1979 | Fed. Rep. of Germany | 361/321 |
| 74913 | 6/1981 | Japan | 361/321 |
| 110219 | 9/1981 | Japan | 361/321 |
| 160960 | 10/1982 | Japan | 252/62.3 ZB |

Primary Examiner—Donald A. Griffin
Attorney, Agent, or Firm—Oblon, Fisher, Spivak, McClelland & Maier

[57] ABSTRACT

A semiconductive ceramic composition capable of exhibiting excellent electrical and physical characteristics sufficient to be used for a boundary-layer type semiconductive ceramic capacitor and such a capacitor capable of being increased in dielectric constant and insulation resistance and exhibiting excellent solderability and tensile strength of electrodes. The composition includes a $SrTiO_3$ base material and an additive for semiconductivity consisting of $Y_2O_3$ and $Nb_2O_5$. The $Y_2O_3$ and $Nb_2O_5$ each are present in an amount of 0.1 to 0.4 mol % based on the composition. The capacitor includes a semiconductive ceramic body formed of the composition, a first conductive layer formed on each of both surfaces of the body and a second conductive layer formed on the first conductive layer. A process for manufacturing the capacitor is also provided.

15 Claims, 1 Drawing Sheet

SEMICONDUCTIVE CERAMIC COMPOSITION AND SEMICONDUCTOR CERAMIC CAPACITOR

BACKGROUND OF THE INVENTION

1. Field of the Invention

This invention relates to a semiconductive ceramic composition for a semiconductive ceramic capacitor, and more particularly to a $SrTiO_3$-$Y_2O_3$-$Nb_2O_5$ system semiconductive ceramic composition suitable for use for a boundary-layer type semiconductive ceramic capacitor and such a capacitor.

2. Background of the Invention

A semiconductive ceramic capacitor which serves as a passive electronic circuit element is generally classified into a surface-layer type one and a boundary-layer type one. The surface-layer type semiconductive ceramic capacitor includes a reduction and reoxidation type semiconductive ceramic capacitor and a barrier-layer type semiconductive ceramic capacitor.

The reduction and reoxidation type semiconductive ceramic capacitor is generally prepared according to the following procedures. A $BaTiO_3$ or $SrTiO_3$ system compact having an additive for semiconductivity added thereto is burned or fired in an atmosphere to prepare dielectric ceramic, which is then subjected to a heat treatment in a reducing atmosphere to produce a semiconductive ceramic body. The so-produced semiconductive ceramic body is subjected to a heat treatment in an atmosphere or oxygen atmosphere, so that oxygen may be diffused into the ceramic body through a surface thereof to fill oxygen defects. This results in a composite ceramic body being formed wherein its surface layer acts as a dielectric layer (reoxidation layer) and its interior serves as a semiconductor. Thereafter, electrodes are arranged on both surfaces of the composite ceramic body to provide a small-sized semiconductive ceramic capacitor of large capacity which has electrostatic capacity determined depending on a thickness of its surface layer and is capable of increasing rated voltage by an increase in thickness.

Now, preparation of the barrier-layer type semiconductive capacitor will be described.

A compact which is typically made of a $BaTiO_3$ system material containing an additive for semiconductivity is burned in an atmosphere and a film of metal such as copper or the like is formed on a surface of the burned compact by vapor deposition. Then, an electrode of a material such as silver or the like of which oxide readily forms a P-type semiconductor is applied onto the metal film and then subjected to a heat treatment in an atmosphere to form a barrier layer of about 0.3 to $3\mu$ on a surface thereof. This results in a barrier-layer type semiconductive ceramic capacitor in which its surface forms a barrier layer insulator on which an external electrode is arranged and its interior forms a semiconductor. A capacitor of this type is suitable for use as a low voltage and large capacity capacitor, because it has large electrostatic capacity although it is decreased in dielectric strength because of the barrier layer having a very small thickness.

The boundary-layer type semiconductive ceramic capacitor is typically manufactured according to the following procedures.

A $BaTiO_3$ or $SrTiO_3$ system compact containing an additive for semiconductivity is subjected to burning in a reducing atmosphere to prepare a semiconductive ceramic body. Then, metal oxide such as $Bi_2O$ is applied onto a surface of the ceramic body and then subjected to a heat treatment in an atmosphere, resulting in metal ion penetrating into an interior of the ceramic body to form an insulation layer containing the metal ion at a grain boundary of the ceramic body. An interior of each of the crystal grains of the ceramic forms a valency-controlled semiconductor doped with the additive for conductivity. Thus, an interior of each of grain layers in the ceramic body is changed to the insulation layer which surrounds the valency-controlled semiconductor. The so-formed insulation grain boundary layers are connected together in a matrix-like shape in all directions to form a sponge-like dielectric. Thereafter, electrodes are baked to a boundary-layer type semiconductive ceramic capacitor.

The semiconductive ceramic capacitors described above are limited to use for bypass because they are small-sized and have large capacity but are inferior in voltage characteristics, dielectric loss and frequency characteristics. However, an advance in manufacturing techniques sufficient to improve the characteristics caused a semiconductive ceramic capacitor of which a base material comprises a $SrTiO_3$ system material to be manufactured which is capable of being extensively used for various purposes extending from coupling, signal circuits and pulse circuits to prevention of noise of a semiconductor.

Nevertheless, the semiconductive ceramic capacitors are still inferior in electrical characteristics as indicated in Table 1 described below, irrespective of such an advance. More particularly, the reduction reoxidation type capacitor is decreased in insulation resistance and increased in dielectric loss as compared with the boundary-layer type capacitor. Likewise the barrier-layer type capacitor has a disadvantage of being decreased in dielectric breakdown voltage to a level as low as 60 to 80 V, decreased in insulation resistance and increased in dielectric loss. Such disadvantages are also encountered with the valency-controlled type capacitor.

A base material of each of such surface-layer type semiconductive ceramic capacitors is a $SrTiO_3$ system, resulting in a thickness of the ceramic body causing the capacitor to fail to exhibit large capacity of $Cs \geqq 5$ $nF/mm^2$.

The boundary-layer type semiconductive ceramic capacitor is increased in insulation resistance and decreased in dielectric loss as compared with the surface layer type ones, because its base material is a $SrTiO_3$ system different from $BaTiO_3$. However, the capacitor has a capacity as low as 3.0 $nF/mm^2$ and fails to exhibit large capacity of $Cs \geqq 5$ $nF/mm^2$.

TABLE 1

| Type of SCC* | Electrostatic Capacity Cs ($nF/mm^2$) | Dielectric Loss tan $\delta$ (%) | Insulation Resistance IR (M$\Omega$) | Insulation Breakdown Voltage Vb (V) | $\epsilon s \times Eb$** (V/mm) |
|---|---|---|---|---|---|
| Reduction & Reoxidation Type | 2.9 | 6.1 | 700 | 210 | $6.9 \times 10^7$ |

TABLE 1-continued

| Type of SCC* | Electrostatic Capacity Cs (nF/mm$^2$) | Dielectric Loss tan δ (%) | Insulation Resistance IR (MΩ) | Insulation Breakdown Voltage Vb (V) | ε$_s$ × Eb** (V/mm) |
|---|---|---|---|---|---|
| Barrier Layer Type (A) | 4.2 | 4.4 | 10 | 80 | 3.8 × 10$^7$ |
| Barrier Layer Type (B) | 4.5 | 5.7 | 3 | 58 | 2.9 × 10$^7$ |
| Conventional Boundary Layer Type | 3.3 | 0.4 | 7,500 | 190 | 7.1 × 10$^7$ |
| Boundary Layer Type (present invention) | 5.3 | 0.6 | 6,000 | 170 | 10.2 × 10$^7$ |

*SCC: Semiconductive ceramic capacitor
**ε$_s$: Dielectric constant, Eb: Insulation breakdown voltage per unit thickness
Cs and tan δ were measured under conditions of 1 kHz and 1 V rms. IR was measured at 50 V for 1 min.
Vb was measurd at a D.C voltage raising velocity of 30-50 V/sec.

In the surface layer type semiconductive ceramic capacitor, capacity C is not inversely proportional to its thickness, accordingly, dielectric constant s may be obtained according to the following equations.

$$Cs\ (nF/mm^2) = 8.85 \times 10^{-6}\ \epsilon_s/t \quad (1)$$

$$Vb\ (V) = Eb \cdot t \quad (2)$$

Accordingly, $$\epsilon_s \cdot Eb\ (V/mm) = 1.13 \times 10^5 Cs \cdot Vb$$

The product ε$_s$·Eb listed on Table 1 was calculated according to the equations described above.

Formation of an electrode of each of the conventional semiconductive ceramic capacitors described above is generally carried out by applying a silver paste consisting of powdered silver, powdered glass and an organic vehicle onto a surface of the ceramic body and then adhering it thereto by baking. Alternatively, it is carried out by electroless plating of nickel.

Formation of the electrode by baking of a silver paste has an advantage of providing not only a ceramic capacitor which exhibits desired electrostatic capacity and dielectric loss tangent but an electrode of sufficient tensile strength and solderability. However, this causes the produced ceramic capacitor to be expensive because silver is noble metal of a high cost. Also, this has another disadvantage that silver is apt to cause metal migration.

The electroless nickel plating is generally carried out by subjecting a surface of a ceramic body to a treatment for rendering the surface roughed using a mixed solution of ammonium fluoride and nitric acid, subjecting the surface to a treatment using a tin chloride solution and a palladium chloride solution and then immersing it in an electroless nickel plating solution to form an electroless nickel deposit on the surface. The plating further includes the steps of applying a resist onto a portion of the nickel deposit on which an electrode is to be formed and immersing the ceramic body in an etching solution such as nitric acid or the like to remove an unnecessary portion of the nickel deposit. Accordingly the ceramic body is damaged or corroded by various kinds of the solutions containing acid and the like during formation of the electrode to cause decomposition of the surface of the ceramic body. Further, leaving of the plating solution and the like on the ceramic body due to a failure in cleaning causes deterioration of the capacity manufactured.

SUMMARY OF THE INVENTION

The present invention has been made in view of the foregoing disadvantages of the prior art.

Accordingly, it is an object of the present invention to provide a semiconductive ceramic composition which is increased in dielectric constant, capable of exhibiting excellent frequency characteristics and temperature characteristics, and decreased in dielectric loss.

It is another object of the present invention to provide a semiconductive ceramic composition which is increased in insulation resistance.

It is another object of the present invention to provide a semiconductive ceramic composition which is capable of enlarging an appropriate range of a SrO/TiO2 ratio.

It is a further object of the present invention to provide a semiconductive ceramic composition which is capable of providing a semiconductive ceramic capacitor, particularly, a boundary-layer type semiconductive ceramic capacitor exhibiting excellent physical and electrical characteristics irrespective of being small-sized.

It is still another object of the present invention to provide a semiconductive ceramic capacitor, particularly, a boundary-layer type one which is highly increased in dielectric constant and insulation resistance.

It is yet another object of the present invention to provide a semiconductive ceramic capacitor, particularly, a boundary-layer type one which includes a highly reliable electrode which is inexpensive, exhibits excellent solderability and tensile strength and does not cause metal migration.

It is still a further object of the present invention to provide a process for manufacturing a semiconductive ceramic capacitor which is capable of providing a semiconductive ceramic capacitor accomplishing the above-noted objects.

In accordance with one aspect of tee present invention, a semiconductive ceramic composition is provided. The composition comprises a base material comprising SrTiO$_3$ and an additive for semiconductivity comprising Y$_2$O$_3$ and Nb$_2$O$_5$. The Y$_2$O$_3$ and Nb$_2$O$_5$ each are present in an amount of 0.1 to 0.4 mol % based on the composition.

In accordance with another aspect of the present invention, a semiconductive ceramic capacitor is provided. The capacitor includes a semiconductive ceramic body formed of a $SrTiO_3$ system semiconductive ceramic composition. On a surface of the ceramic body is deposited a first conductive layer which is formed of a material mainly consisting of metal powder selected from the group consisting of zinc powder and aluminum powder. The capacitor also includes a second conductive layer deposited on the first conductive layer, which is formed of a material mainly consisting of copper powder.

In accordance with a further aspect of the present invention a process for manufacturing a semiconductive ceramic capacitor. In the process, a first conductive paste is applied onto a surface of a semiconductive ceramic body and baked to form a first conductive layer on the ceramic body. Then, a second conductive paste is applied onto the first conductive layer and baked to form a second conductive layer.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE INVENTION

The present invention is directed to a semiconductive ceramic composition. The ceramic composition of the present invention includes a base material comprising $SrTiO_3$ and an additive for semiconductivity comprising $Y_2O_3$ and $Nb_2O_5$. The $Y_2O_3$ and $Nb_2O_5$ each are present in an amount of 0.1 to 0.4 mol % based on the composition. The composition may contain MnO of 0.02 to 0.2 mol % based on the composition. Also, it may contain $SiO_2$ of 0.01 to 0.1 mol % based on the composition.

The present invention is also directed to a semiconductive ceramic capacitor. The capacitor includes a semiconductive ceramic body formed of such a $SrTiO_3$ system semiconductive ceramic composition as described above. The capacitor also includes a first conductive layer deposited on a surface of the ceramic body and a second conductive layer deposited on the first conductive layer. The first conductive layer is formed of a material mainly consisting of metal powder selected from the group consisting of zinc powder and aluminum powder and the second conductive layer may be formed of a material mainly consisting of copper powder.

Further, the present invention is directed to a process for manufacturing such a semiconductive ceramic capacitor as described above. In the process, a first conductive paste is applied onto a surface of a semiconductive ceramic body and baked to form a first conductive layer on the ceramic body. Then, a second conductive paste is applied onto the first conductive layer and baked to form a second conductive layer thereon.

Figure 1:
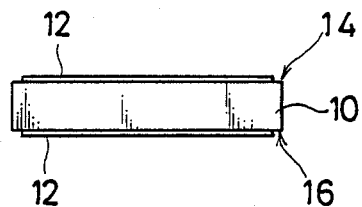
FIG. 1 is a front elevation view of a ceramic body of a semiconductive ceramic capacitor according to the present invention wherein a first conductive layer is formed on each of upper and lower surfaces of the ceramic body.
Figure 2:
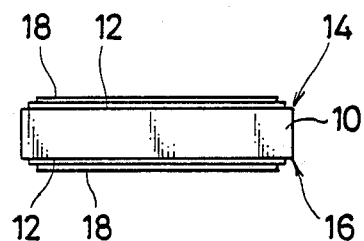
FIG. 2 is a front elevation view of the ceramic body shown in FIG. 1 on which a second conductive layer is further formed on each of the first conductive layers.
Figure 3:
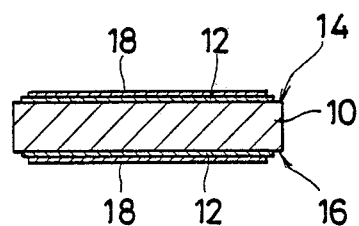
FIG. 3 is a vertical sectional view showing an embodiment of a semiconductive ceramic capacitor produced according to the present invention.

More particularly, the semiconductive ceramic capacitor may be constructed in such a manner as shown in FIGS. 1 to 3. The capacitor includes a semiconductive ceramic body 10 which is formed of a semiconductive ceramic composition consisting of a $SrTiO_3$ base material and an additive for semiconductivity consisting of $Y_2O_3$ and $Nb_2O_5$. It is convenient that $Y_2O_3$ and $Nb_2O_5$ each are present in an amount of 0.1 to 0.4 mol % based on the composition. The composition may contain at least one of MnO and $SiO_2$. MnO and $SiO_2$ may be present in an amount of 0.02 to 0.2 mol % and 0.01 to 0.1 mol % based on the composition, respectively. In the embodiment, when the composition is subjected to sintering, Bi may be caused to be present at a gain boundary of the composition.

The capacitor also includes a first conductive layer 12 depositedly formed on a surface of the ceramic body 10. In the embodiment, the first conductive layer 12 is deposited on each of upper and lower surfaces 14 and 16 of the ceramic body 10 by baking. The first conductive layer 12 is formed of a first conductive paste mainly consisting of zinc powder or aluminum powder. The first conductive paste may further contain at least one of glass powder such as frit glass powder, and an organic vehicle acting as an organic binder. Furthermore, when the first conductive paste mainly consists of zinc powder, it may further contain powder of at least one material selected from the group consisting of silver, aluminum, copper and their oxides; whereas, when it mainly consists of aluminum powder, it may contain powder of at least one material selected from the group consisting of silver, zinc, copper and their oxides. Addition of such powder enhances advantages of the capacitor. The capacitor of the illustrated embodiment further includes a second conductive layer 18 depositedly formed on each of the first conductive layers 12 by baking. The second conductive layer 18 may be formed of a second conductive paste mainly consisting of copper powder. It may also contain at least one of glass powder such as frit glass powder, metal oxide powder and an organic vehicle acting as an organic binder. In particular, addition of the metal oxide powder causes the second conductive layer to exhibit more performance.

The so-formed semiconductive ceramic capacitor of the present invention exhibits excellent electrostatic capacity, dielectric loss tangent (tan δ) and insulation resistance, and includes an electrode of high tensile strength and good solderability.

Also, the capacitor is highly reliable in operation because zinc or aluminum never causes such metal migration as seen in silver and manufactured at a low cost because zinc and aluminum is substantially inexpensive as compared with silver.

Formation of the second conductive layer on the first conductive layer highly improves solderability of the capacitor because it mainly consists of copper exhibiting excellent solderability.

The invention will be understood more readily with reference to the following examples; however, these examples are intended to illustrate the invention and are not to be construed to limit the scope of the invention.

EXAMPLE 1

A semiconductive ceramic composition was prepared.

$SrCO_3$, $TiO_2$, $MnCO_3$ and $SiO_2$ were used as a base material and $Y_2O_3$ and $Nb_2O_5$ were used as an additive for semiconductivity. The base material and additive for semiconductivity were weighed so that each composition may be obtained which has a composition ratio as shown in Tables 2 and 3. The base material and semiconductive material were subjected to wet blending in a ball mill of synthetic resin using water and pebbles for 20 hours while stirring to prepare a mixture. Then, the so-obtained mixture was dewatered and dried, and provisionally burned by heating and cooling it at rates of 200° C./hr and stabilizing it at 1200° C. for 2 hours to carry out chemical reaction of the mixture. Subsequently, the mixture was powdered and blended in the ball mill in which water and pebbles were placed for 16 hours and then dewatered and dried, to which polyvinyl alcohol (PVA) was added as an organic binder to carry out granulation and grading to prepare granulated powder. The granulated powder was then formed into a disc-like compact of 10 mm in diameter and 0.5 mm in thickness at compacting pressure of about 3 tons/cm². The compact was treated at 800° C. for 1 hour to remove the binder therefrom and then subjected to burning at about 1450° C. for about 2 hours in a stream of a reducing atmosphere ($H_2+N_2$ atmosphere) to provide the compact with semiconductivity, resulting in a semiconductive ceramic element having a dimensions of 8.5 mm in diameter and 0.4 mm in thickness. Thereafter, a $Bi_2O_3$-CuO system frit paste was applied in an amount of 3 mg onto both surfaces of the ceramic element by screen printing so as to act as a diffusion material and then burned at 1150° C. for 2 hours in air, resulting in a semiconductive ceramic body of which a grain boundary is formed with an insulating layer. Then, a silver paste was applied onto each of the both surfaces and baked at 800° C. to an electrode.

The so-prepared each specimen had electrical characteristics as shown in Tables 2 and 3, wherein dielectric constant ($\epsilon_s$) and dielectric loss (tan δ) were measured at a frequency of 1 kHz and insulation resistance was measured at a room temperature of 20° C. under the application of 50 V.

TABLE 2

| Specimen No. | Composition Ratio (mol %) | | | | Electrical Characteristics | | | | |
|---|---|---|---|---|---|---|---|---|---|
| | $SrTiO_3$ | $Y_2O_3$ | $Nb_2O_5$ | MnO | Dielectric Constant $\epsilon_s$ | Dielectric Loss tan δ (%) | Insulation Resistance IR (mΩ) | D.C. Breakdown Voltage Eb (V/mm) | $\epsilon_s \times$ Eb (V/mm) ($\times 10^7$) |
| 1 | 99.90 | 0 | 0.10 | 0 | 50,000 | 0.33 | 3500 | 480 | 2.4 |
| 2 | 99.75 | 0 | 0.25 | 0 | 56,000 | 0.39 | 3600 | 470 | 2.6 |
| 3 | 99.60 | 0 | 0.40 | 0 | 65,000 | 0.41 | 3100 | 440 | 2.9 |
| 4 | 99.90 | 0.05 | 0.05 | 0 | 49,000 | 0.35 | 4900 | 640 | 3.1 |
| 5 | 99.70 | 0.05 | 0.25 | 0 | 58,000 | 0.41 | 3800 | 420 | 2.4 |
| 6 | 99.45 | 0.05 | 0.50 | 0 | 70,000 | 0.69 | 2000 | 260 | 2.0 |
| 7 | 99.90 | 0.10 | 0 | 0 | 57,000 | 0.34 | 3900 | 520 | 3.0 |
| 8 | 99.80 | 0.10 | 0.10 | 0 | 75,000 | 0.29 | 4400 | 650 | 4.9 |
| 9 | 99.65 | 0.10 | 0.25 | 0 | 88,000 | 0.35 | 4000 | 550 | 4.8 |
| 10 | 99.50 | 0.10 | 0.40 | 0 | 86,000 | 0.41 | 3700 | 480 | 4.1 |
| 11 | 99.75 | 0.25 | 0 | 0 | 50,000 | 0.39 | 3500 | 680 | 3.4 |
| 12 | 99.70 | 0.25 | 0.05 | 0 | 61,000 | 0.34 | 3700 | 650 | 4.0 |
| 13 | 99.65 | 0.25 | 0.10 | 0 | 82,000 | 0.32 | 3500 | 670 | 5.5 |
| 14 | 99.50 | 0.25 | 0.25 | 0 | 120,000 | 0.36 | 3300 | 510 | 6.1 |
| 15 | 99.49 | 0.25 | 0.25 | 0.01 | 114,000 | 0.43 | 4100 | 560 | 6.4 |
| 16 | 99.48 | 0.25 | 0.25 | 0.02 | 100,000 | 0.48 | 5400 | 600 | 6.0 |
| 17 | 99.45 | 0.25 | 0.25 | 0.05 | 87,000 | 0.53 | 6300 | 630 | 5.5 |
| 18 | 99.40 | 0.25 | 0.25 | 0.10 | 85,000 | 0.56 | 7600 | 650 | 5.5 |
| 19 | 99.30 | 0.25 | 0.25 | 0.20 | 79,000 | 0.72 | 8500 | 690 | 5.5 |
| 20 | 99.20 | 0.25 | 0.25 | 0.30 | 62,000 | 1.21 | 9200 | 820 | 5.1 |
| 21 | 99.35 | 0.25 | 0.40 | 0 | 107,000 | 0.38 | 3700 | 540 | 5.8 |
| 22 | 99.25 | 0.25 | 0.50 | 0 | 98,000 | 0.61 | 2300 | 310 | 3.0 |
| 23 | 99.60 | 0.40 | 0 | 0 | 37,000 | 0.66 | 4600 | 890 | 3.3 |
| 24 | 99.50 | 0.40 | 0.10 | 0 | 77,000 | 0.39 | 4000 | 800 | 6.2 |
| 25 | 99.35 | 0.40 | 0.25 | 0 | 105,000 | 0.35 | 4100 | 650 | 6.8 |
| 26 | 99.20 | 0.40 | 0.40 | 0 | 112,000 | 0.36 | 3600 | 580 | 6.5 |
| 27 | 99.45 | 0.50 | 0.05 | 0 | 30,000 | 1.03 | 7600 | 1060 | 3.2 |
| 28 | 99.25 | 0.50 | 0.25 | 0 | 48,000 | 0.97 | 5100 | 690 | 3.3 |
| 29 | 99.00 | 0.50 | 0.50 | 0 | 61,000 | 0.89 | 3000 | 370 | 2.3 |

TABLE 3

| Specimen No. | Composition Ratio (mol %) | | | | | SrO/ $TiO_2$ Ratio | Electrical Characteristics | | | |
|---|---|---|---|---|---|---|---|---|---|---|
| | $SrTiO_3$ | $Y_2O_3$ | $Nb_2O_5$ | MnO | $SiO_2$ | | Dielectric Constant $\epsilon_s$ | Dielectric Loss tan δ (%) | Insulation Resistance IR (MΩ) | D.C. Breakdown Voltage Eb (V/mm) | $\epsilon_s \times$ Eb (V/mm) ($\times 10^7$) |
| 30 | 99.45 | 0.25 | 0.25 | 0.05 | 0 | 0.998 | 103,000 | 0.55 | 1700 | 250 | 2.6 |
| 31 | 99.45 | 0.25 | 0.25 | 0.05 | 0 | 0.999 | 114,000 | 0.51 | 6800 | 590 | 6.7 |
| 32 | 99.45 | 0.25 | 0.25 | 0.05 | 0 | 1.001 | 87,000 | 0.53 | 6300 | 630 | 5.5 |
| 33 | 99.45 | 0.25 | 0.25 | 0.05 | 0 | 1.002 | 39,000 | 1.57 | 7400 | 780 | 3.0 |
| 34 | 99.445 | 0.25 | 0.25 | 0.05 | 0.005 | 0.998 | 98,000 | 0.66 | 2300 | 290 | 2.8 |
| 35 | 99.445 | 0.25 | 0.25 | 0.05 | 0.005 | 0.999 | 104,000 | 0.61 | 6900 | 650 | 6.8 |
| 36 | 99.445 | 0.25 | 0.25 | 0.05 | 0.005 | 1.001 | 113,000 | 0.57 | 6300 | 640 | 7.2 |
| 37 | 99.445 | 0.25 | 0.25 | 0.05 | 0.005 | 1.002 | 35,000 | 1.43 | 7200 | 890 | 3.1 |
| 38 | 99.44 | 0.25 | 0.25 | 0.05 | 0.01 | 0.997 | 104,000 | 0.57 | 2700 | 310 | 3.2 |

TABLE 3-continued

| Specimen No. | Composition Ratio (mol %) | | | | | SrO/TiO₂ Ratio | Electrical Characteristics | | | | |
|---|---|---|---|---|---|---|---|---|---|---|---|
| | SrTiO₃ | Y₂O₃ | Nb₂O₅ | MnO | SiO₂ | | Dielectric Constant $\epsilon_s$ | Dielectric Loss tan δ (%) | Insulation Resistance IR (MΩ) | D.C. Breakdown Voltage Eb (V/mm) | $\epsilon_s \times$ Eb (V/mm) ($\times 10^7$) |
| 39 | 99.44 | 0.25 | 0.25 | 0.05 | 0.01 | 0.998 | 110,000 | 0.46 | 6700 | 630 | 7.3 |
| 40 | 99.44 | 0.25 | 0.25 | 0.05 | 0.01 | 1.002 | 111,000 | 0.40 | 7000 | 650 | 7.2 |
| 41 | 99.44 | 0.25 | 0.25 | 0.05 | 0.01 | 1.003 | 52,000 | 1.29 | 7200 | 860 | 4.5 |
| 42 | 99.40 | 0.25 | 0.25 | 0.05 | 0.05 | 0.996 | 96,000 | 0.53 | 1800 | 280 | 2.7 |
| 43 | 99.40 | 0.25 | 0.25 | 0.05 | 0.05 | 0.997 | 111,000 | 0.40 | 7300 | 610 | 6.8 |
| 44 | 99.40 | 0.25 | 0.25 | 0.05 | 0.05 | 1.003 | 109,000 | 0.41 | 6900 | 710 | 7.7 |
| 45 | 99.40 | 0.25 | 0.25 | 0.05 | 0.05 | 1.004 | 44,000 | 1.30 | 7100 | 830 | 3.7 |
| 46 | 99.35 | 0.25 | 0.25 | 0.05 | 0.10 | 0.996 | 82,000 | 0.52 | 3100 | 340 | 2.8 |
| 47 | 99.35 | 0.25 | 0.25 | 0.05 | 0.10 | 0.997 | 97,000 | 0.49 | 7200 | 730 | 7.1 |
| 48 | 99.35 | 0.25 | 0.25 | 0.05 | 0.10 | 1.003 | 98,000 | 0.43 | 7600 | 770 | 7.5 |
| 49 | 99.35 | 0.25 | 0.25 | 0.05 | 0.10 | 1.004 | 33,000 | 1.23 | 8200 | 1000 | 3.3 |
| 50 | 99.25 | 0.25 | 0.25 | 0.05 | 0.20 | 0.998 | 41,000 | 0.48 | 9500 | 1110 | 4.6 |
| 51 | 99.25 | 0.25 | 0.25 | 0.05 | 0.20 | 1.002 | 39,000 | 0.41 | 8900 | 1070 | 4.2 |

As can be seen from tables 2 and 3, the semiconductive ceramic composition of the present invention was increased in dielectric constant ($\epsilon_s$) to a level as high as about 75,000 or more and highly decreased in dielectric loss (tan δ) to 0.29 to 0.72%.

Also, Tables 2 and 3 indicates that addition of only one of Y₂O₃ and Nb₂O₅ as the additive for semiconductivity causes the composition to fail to be increased in dielectric constant ($\epsilon_s$) and D.C breakdown voltage (Eb) (Specimen Nos. 1, 2, 3, 7, 11 and 23). Also, addition of both Y₂O₃ and Nb₂O₅ each in an amount below 0.1 mol % failed in a significant increase in dielectric constant and D.C breakdown voltage (Specimen Nos. 4, 5, 6, 12 and 27). Further, Y₂O₃ exceeding 0.4 mol % decreased the dielectric constant (Specimen Nos. 27 to 29) and Nb₂O₅ exceeding 0.4 mol % decreased D.C breakdown voltage (Specimen Nos. 6, 22 and 29).

Furthermore, MnO below 0.02 mol % failed in a significant increase in insulation resistance IR (Specimen Nos. 14 and 15), wherein MnO exceeding 0.2 mol % caused an increase in dielectric loss and a decrease in dielectric constant (Specimen No. 20).

In addition, Table 3 indicates that addition of SiO₂ in an amount below 0.01 mol % causes an appropriate range of a SrO/TiO₂ ratio to be narrowed to 0.002 (Specimen Nos. 30–37), whereas SiO₂ above 0.10 mol % leaded to a decrease in dielectric constant (Specimen Nos. 50 and 51). On the contrary, SiO₂ in an amount of 0.01 to 0.1 mol % enlarged an appropriate range of a SrO/TiO₂ to 0.004 to 0.006.

Thus, it will be noted that the semiconductive ceramic composition of the example is capable of effectively exhibiting the above-noted advantages of the present invention.

EXAMPLE 2

A semiconductive ceramic composition and a semiconductive ceramic capacitor which includes electrodes formed of zinc and copper were prepared.

(1) Preparation of Semiconductive Ceramic Composition:

Example 1 was substantially repeated to obtain each composition which has a composition ratio as shown in Table 4 and 5.

The so-prepared each specimen had electrical characteristics as shown in Tables 4 and 5, wherein dielectric constant ($\epsilon_s$) and dielectric loss (tan δ) were measured at a frequency of 1 kHz and insulation resistance was measured at a room temperature of 20° C. under the application of 50 V.

TABLE 4

| Specimen No. | Composition Ratio (mol %) | | | | Electrical Characteristics | | | | |
|---|---|---|---|---|---|---|---|---|---|
| | SrTiO₃ | Y₂O₃ | Nb₂O₅ | MnO | Dielectric Constant $\epsilon_s$ | Dielectric Loss tan δ (%) | Insulation Resistance IR (m Ω) | D.C. Breakdown Voltage Eb (V/mm) | $\epsilon_s \times$ Eb (V/mm) ($\times 10^7$) |
| 1 | 99.90 | 0 | 0.10 | 0 | 75,000 | 0.40 | 2500 | 410 | 3.1 |
| 2 | 99.75 | 0 | 0.25 | 0 | 84,000 | 0.47 | 2500 | 400 | 3.4 |
| 3 | 99.60 | 0 | 0.40 | 0 | 97,500 | 0.49 | 2200 | 370 | 4.3 |
| 4 | 99.90 | 0.05 | 0.05 | 0 | 73,500 | 0.42 | 3400 | 540 | 4.7 |
| 5 | 99.70 | 0.05 | 0.25 | 0 | 87,000 | 0.49 | 2700 | 360 | 3.1 |
| 6 | 99.45 | 0.05 | 0.50 | 0 | 105,000 | 0.83 | 1400 | 220 | 2.3 |
| 7 | 99.90 | 0.10 | 0 | 0 | 85,500 | 0.41 | 2700 | 440 | 3.8 |
| 8 | 99.80 | 0.10 | 0.10 | 0 | 112,500 | 0.35 | 3100 | 550 | 6.2 |
| 9 | 99.65 | 0.10 | 0.25 | 0 | 122,000 | 0.42 | 2800 | 470 | 6.2 |
| 10 | 99.50 | 0.10 | 0.40 | 0 | 129,000 | 0.49 | 2600 | 410 | 5.3 |
| 11 | 99.75 | 0.25 | 0 | 0 | 75,000 | 0.47 | 2500 | 580 | 4.4 |
| 12 | 99.70 | 0.25 | 0.05 | 0 | 91,500 | 0.41 | 2600 | 550 | 5.0 |
| 13 | 99.65 | 0.25 | 0.10 | 0 | 123,000 | 0.38 | 2500 | 570 | 7.0 |
| 14 | 99.50 | 0.25 | 0.25 | 0 | 180,000 | 0.43 | 2300 | 430 | 7.7 |
| 15 | 99.49 | 0.25 | 0.25 | 0.01 | 171,000 | 0.52 | 2900 | 480 | 8.2 |
| 16 | 99.48 | 0.25 | 0.25 | 0.02 | 150,000 | 0.58 | 3800 | 510 | 7.7 |
| 17 | 99.45 | 0.25 | 0.25 | 0.05 | 130,500 | 0.64 | 4400 | 540 | 7.0 |
| 18 | 99.40 | 0.25 | 0.25 | 0.10 | 127,500 | 0.67 | 5300 | 550 | 7.0 |
| 19 | 99.30 | 0.25 | 0.25 | 0.20 | 118,500 | 0.86 | 6000 | 590 | 7.0 |
| 20 | 99.20 | 0.25 | 0.25 | 0.30 | 93,000 | 1.45 | 6400 | 700 | 6.5 |
| 21 | 99.35 | 0.25 | 0.40 | 0 | 160,500 | 0.46 | 2600 | 460 | 7.4 |

TABLE 4-continued

| Specimen No. | Composition Ratio (mol %) | | | | Electrical Characteristics | | | | |
|---|---|---|---|---|---|---|---|---|---|
| | | | | | Dielectric Constant $\epsilon_s$ | Dielectric Loss tan δ (%) | Insulation Resistance IR (mΩ) | D.C. Breakdown Voltage Eb (V/mm) | $\epsilon_s \times$ Eb (V/mm) ($\times 10^7$) |
| | SrTiO$_3$ | Y$_2$O$_3$ | Nb$_2$O$_5$ | MnO | | | | | |
| 22 | 99.25 | 0.25 | 0.50 | 0 | 147,000 | 0.73 | 1600 | 260 | 3.8 |
| 23 | 99.90 | 0.40 | 0 | 0 | 55,500 | 0.79 | 3200 | 760 | 4.2 |
| 24 | 99.50 | 0.40 | 0.10 | 0 | 115,500 | 0.46 | 2800 | 680 | 7.9 |
| 25 | 99.35 | 0.40 | 0.25 | 0 | 157,500 | 0.42 | 2900 | 550 | 8.7 |
| 26 | 99.20 | 0.40 | 0.40 | 0 | 168,000 | 0.43 | 2500 | 490 | 8.2 |
| 27 | 99.45 | 0.50 | 0.05 | 0 | 45,000 | 1.24 | 5300 | 900 | 4.1 |
| 28 | 99.25 | 0.50 | 0.25 | 0 | 72,000 | 1.16 | 3600 | 590 | 4.2 |
| 29 | 99.00 | 0.50 | 0.50 | 0 | 91,500 | 1.07 | 2100 | 310 | 2.8 |

TABLE 5

| Specimen No. | Composition Ratio (mol %) | | | | | SrO/TiO$_2$ Ratio | Electrical Characteristics | | | |
|---|---|---|---|---|---|---|---|---|---|---|
| | | | | | | | Dielectric Constant $\epsilon_5$ | Dielectric Loss tan δ (%) | Insulation Resistance IR (MΩ) | D.C. Breakdown Voltage Eb (V/mm) | $\epsilon_s \times$ Eb (V/mm) ($\times 10^7$) |
| | SrTiO$_3$ | Y$_2$O$_3$ | Nb$_2$O$_5$ | MnO | SiO$_2$ | | | | | | |
| 30 | 99.45 | 0.25 | 0.25 | 0.05 | 0 | 0.998 | 154,500 | 0.66 | 1200 | 210 | 3.2 |
| 31 | 99.45 | 0.25 | 0.25 | 0.05 | 0 | 0.999 | 171,000 | 0.61 | 4800 | 500 | 8.6 |
| 32 | 99.45 | 0.25 | 0.25 | 0.05 | 0 | 1.001 | 130,500 | 0.64 | 4400 | 540 | 7.0 |
| 33 | 99.45 | 0.25 | 0.25 | 0.05 | 0 | 1.002 | 58,500 | 1.88 | 5200 | 660 | 3.9 |
| 34 | 99.445 | 0.25 | 0.25 | 0.05 | 0.005 | 0.998 | 147,000 | 0.79 | 1600 | 250 | 3.7 |
| 35 | 99.445 | 0.25 | 0.25 | 0.05 | 0.005 | 0.999 | 156,000 | 0.73 | 4800 | 550 | 8.6 |
| 36 | 99.445 | 0.25 | 0.25 | 0.05 | 0.005 | 1.001 | 169,500 | 0.68 | 4400 | 540 | 9.2 |
| 37 | 99.445 | 0.25 | 0.25 | 0.05 | 0.005 | 1.002 | 57,500 | 1.72 | 5000 | 760 | 4.0 |
| 38 | 99.44 | 0.25 | 0.25 | 0.05 | 0.01 | 0.997 | 156,000 | 0.68 | 1900 | 260 | 4.1 |
| 39 | 99.44 | 0.25 | 0.25 | 0.05 | 0.01 | 0.998 | 165,000 | 0.55 | 4700 | 540 | 8.9 |
| 40 | 99.44 | 0.25 | 0.25 | 0.05 | 0.01 | 1.002 | 166,500 | 0.48 | 4900 | 550 | 9.2 |
| 41 | 99.44 | 0.25 | 0.25 | 0.05 | 0.01 | 1.003 | 78,000 | 1.55 | 5000 | 730 | 5.7 |
| 42 | 99.40 | 0.25 | 0.25 | 0.05 | 0.05 | 0.996 | 144,000 | 0.64 | 1300 | 240 | 3.5 |
| 43 | 99.40 | 0.25 | 0.25 | 0.05 | 0.05 | 0.997 | 166,500 | 0.48 | 5100 | 520 | 8.7 |
| 44 | 99.40 | 0.25 | 0.25 | 0.05 | 0.05 | 1.003 | 163,500 | 0.49 | 4800 | 600 | 9.8 |
| 45 | 99.80 | 0.25 | 0.25 | 0.05 | 0.05 | 1.004 | 66,000 | 1.56 | 5000 | 710 | 4.7 |
| 46 | 99.35 | 0.25 | 0.25 | 0.05 | 0.10 | 0.996 | 123,000 | 0.62 | 2200 | 290 | 3.6 |
| 47 | 99.35 | 0.25 | 0.25 | 0.05 | 0.10 | 0.997 | 145,500 | 0.59 | 5000 | 620 | 9.0 |
| 48 | 99.35 | 0.25 | 0.25 | 0.05 | 0.10 | 1.003 | 147,000 | 0.52 | 5300 | 650 | 9.6 |
| 49 | 99.35 | 0.25 | 0.25 | 0.05 | 0.10 | 1.004 | 49,500 | 1.48 | 5700 | 850 | 4.2 |
| 50 | 99.25 | 0.25 | 0.25 | 0.05 | 0.20 | 0.998 | 61,500 | 0.58 | 6700 | 940 | 5.8 |
| 51 | 99.25 | 0.25 | 0.25 | 0.05 | 0.20 | 1.002 | 58,500 | 0.49 | 6200 | 910 | 5.3 |

As can be seen from Table 4 and 5, the semiconductive ceramic composition of the present invention was increased in dielectric constant ($\epsilon_s$) to a level as high as about 115000 or more and highly decreased in dielectric loss (tan δ) to 0.35 to 0.86%.

Also, Tables 4 and 5 indicates that addition of only one of Y$_2$O$_3$ or Nb$_2$O$_5$ as the additive for semiconductivity causes the composition to fail to be increased in dielectric constant ($\epsilon_s$) and D.C breakdown voltage (Eb) (Specimen Nos. 1, 2, 3, 7, 11 and 23). Also, addition of both Y$_2$O$_3$ and Nb$_2$O$_5$ each in an amount below 0.1 mol % failed in a significant increase in dielectric constant and D.C breakdown voltage (Specimen Nos. 4, 5, 6, 12 and 27). Further, Y$_2$O$_3$ exceeding 0.4 mol % decreased the dielectric constant (Specimen Nos. 27 to 29) and Nb$_2$O$_5$ exceeding 0.4 mol % decreased D.C breakdown voltage (Specimen Nos. 6, 22 and 29).

Furthermore, MnO below 0.02 mol % failed in a significant increase in insulation resistance IR (Specimen Nos. 14 and 15), wherein MnO exceeding 0.2 mol % caused an increase in dielectric loss and a decrease in dielectric constant (Specimen No. 20).

In addition, Table 5 indicates that SiO$_2$ in an amount below 0.01 mol % causes an appropriate range of a SrO/TiO$_2$ ratio to be narrowed to 0.002 (Specimen Nos. 30-37), whereas SiO$_2$ above 0.10 mol % leaded to a decrease in dielectric constant (Specimen Nos. 50 and 51). On the contrary, SiO$_2$ in an amount of 0.01 to 0.1 mol % enlarged an appropriate range of a SrO/TiO$_2$ to 0.004 to 0.006.

(2) Formation of Semiconductive Ceramic Capacitor

A semiconductive ceramic capacitor provided with zinc and copper electrodes was prepared using the so-prepared semiconductive ceramic body according to the following procedures.

Preparation of Zinc Paste:

100 parts by weight zinc powder having an average particle diameter of 2.5 μm was used, and B$_2$O$_3$ (25 wt %)-SiO$_2$ (10 wt %)-ZnO (65 wt %) system frit glass powder having a particle size passing through a sieve of 325 mesh was added to the zinc powder at a mixing ratio shown in Table 6. Further, fine silver or metal oxide powder and an organic vehicle of ethyl cellulose and butyl carbitol acting as an organic binder were added thereto to form a mixture, which was then mixed while stirring to prepare a zinc paste.

TABLE 6

| Specimen No. | Zn Paste Frit* Glass | Zn Paste Silver* or Metal Oxide | Baking Temp. (°C.) | Cu Paste Frit* Glass | Cu Paste Silver* or Metal Oxide | Dielectric Constant $\epsilon_s$ | Dielectric Loss Tangent tan δ (%) | Solderability | Tensile Strength (kg) |
|---|---|---|---|---|---|---|---|---|---|
| 1 | 0 | 0 | 700 | 0 | 0 | 128,000 | 1.50 | Good | 0.9 |
| 2 | 0.5 | 0 | 700 | 0 | 0 | 131,000 | 1.43 | Good | 0.9 |
| 3 | 1.0 | 0 | 700 | 0 | 0 | 127,000 | 1.17 | Good | 1.6 |
| 4 | 5.0 | 0 | 700 | 0 | 0 | 132,000 | 0.93 | Good | 2.2 |
| 5 | 10.0 | 0 | 700 | 0 | 0 | 140,000 | 0.77 | Good | 2.3 |
| 6 | 20.0 | 0 | 700 | 0 | 0 | 153,000 | 0.68 | Good | 2.3 |
| 7 | 30.0 | 0 | 700 | 0 | 0 | 148,000 | 0.73 | Good | 2.4 |
| 8 | 20.0 | Ag:2 | 700 | 0 | 0 | 149,000 | 0.71 | Good | 2.2 |
| 9 | 20.0 | Ag:5 | 700 | 0 | 0 | 145,000 | 0.71 | Good | 2.3 |
| 10 | 20.0 | Ag:10 | 700 | 0 | 0 | 147,000 | 0.68 | Good | 2.3 |
| 11 | 20.0 | $Bi_2O_3$:2 | 700 | 0 | 0 | 151,000 | 0.82 | Good | 2.3 |
| 12 | 20.0 | $Bi_2O_3$:4 | 700 | 0 | 0 | 151,000 | 0.86 | Good | 2.3 |
| 13 | 20.0 | PbO:2 | 700 | 0 | 0 | 147,000 | 0.77 | Good | 2.2 |
| 14 | 20.0 | PbO:4 | 700 | 0 | 0 | 148,000 | 0.73 | Good | 2.3 |
| 15 | 20.0 | 0 | 700 | 1.0 | 0 | 147,000 | 0.66 | Good | 2.3 |
| 16 | 20.0 | 0 | 700 | 2.0 | 0 | 141,000 | 0.71 | Good | 2.3 |
| 17 | 20.0 | 0 | 700 | 4.0 | 0 | 146,000 | 0.68 | Good | 2.4 |
| 18 | 20.0 | 0 | 700 | 6.0 | 0 | 148,000 | 0.64 | Good | 2.3 |
| 19 | 10.0 | Ag:5 | 700 | 4.0 | 0 | 140,000 | 0.66 | Good | 2.2 |
| 20 | 10.0 | Ag:10 | 700 | 4.0 | 0 | 141,000 | 0.68 | Good | 2.1 |
| 21 | 20.0 | 0 | 700 | 0 | $Bi_2O_3$:4 | 138,000 | 0.66 | Good | 2.0 |
| 22 | 20.0 | 0 | 700 | 0 | PbO:2 | 134,000 | 0.71 | Good | 2.3 |
| 23 | 20.0 | 0 | 700 | 4.0 | $Bi_2O_3$:2 | 140,000 | 0.68 | Good | 2.3 |
| 24 | 20.0 | 0 | 700 | 4.0 | PbP:2 | 144,000 | 0.64 | Good | 2.0 |
| 25 | 20.0 | Ag:10 | 700 | 4.0 | $Bi_2O_3$:4 | 137,000 | 0.64 | Good | 2.1 |
| 26 | 20.0 | $Bi_2O_3$:4 | 700 | 4.0 | $Bi_2O_3$:4 | 140,000 | 0.66 | Good | 2.2 |

*Parts by weight

Formation of first conductive layer:

First conductive layers were formed on surfaces of the semiconductive ceramic body using the zinc paste prepared as described above. A 200 mesh screen formed of polyester synthetic resin sold under a tradename "Tetoron" was used to apply the zinc paste onto an upper surface of the semiconductive ceramic body by printing. Then, the ceramic body was dried at 125° C. for about 10 minutes in a drying oven.

The zinc paste was also applied onto a lower surface of the semiconductive ceramic body and dried in substantially the same manner as described above and then supplied to a batch furnace while being carried on a stainless steel wire mesh to be burned at about 700° C. for 10 minutes. A time used for the burning was about 60 minutes in all including temperature rise and fall operation. Thus, a first conductive layer mainly consisting of zinc and having a diameter of about 7.5 mm was formed on each of both surfaces of the semiconductive ceramic body. Thus obtained ceramic body had such a structure as shown in FIG. 1.

Preparation of copper paste:

100 parts by weight copper powder having an average particle diameter of 0.5 μm was used, and $B_2O_3$ (50 wt %)PbO(50 wt %) system frit glass powder having a particle size passing through a sieve of 325 mesh was added to the copper powder at a mixing ratio shown in Table 5, and further metal oxide powder and an organic vehicle consisting of ethyl cellulose and butyl carbitol and acting as an organic binder were added thereto and mixed together while stirring to prepare a copper paste.

Formation of Second Conductive Layer:

The so-prepared copper paste was applied onto each of the first conductive layers by printing and dried in substantially the same manner as in the zinc paste described above. Then, it was burned at 360° C. for 20 minutes in a stream of a reducing atmosphere (90%$N_2$+10%$H_2$) to carry out baking, resulting in a second conductive layer which mainly consists of copper and has a diameter of about 5 mm being formed on each of the first conductive layers in substantially the same manner as shown in FIG. 2. Thus, a semiconductive ceramic capacitor of the present invention was prepared which comprises the semiconductive ceramic body, the first conductive layers deposited on both surfaces of the body and mainly consisting of zinc, the second conductive layers deposited on the first conductive layers and mainly consisting of copper and had substantially the structure as shown in FIG. 3.

Evaluation of Electrode

In order to evaluate the electrodes of the so-obtained semiconductive ceramic capacitor, dielectric constant ($\epsilon_s$), dielectric loss tangent (tan δ), solderability and tensile strength of the electrodes were measured. The results were as shown in Table 6.

In order to determine criteria of judgement of the electrodes of the semiconductive ceramic capacitor of the present invention, a conventional $SrTiO_3$ system semiconductive ceramic capacitor having a silver electrode structure (hereinafter referred to as "conventional capacitor") was manufactured according to the following procedures. More particularly, a $SrTiO_3$ system semiconductive ceramic body having substantially the same composition and shape as that of this example was prepared and a silver paste was deposited on one surface of the ceramic body by baking according to a conventional method to form a silver electrode thereon. Then, electrical and mechanical tests were carried out on the conventional capacitor to measure its dielectric constant ($\epsilon_s$). dielectric loss tangent (tan δ) (%), solderability and tensile strength T (kg) of the electrode. The results indicated that dielectric constant ($\epsilon_s$) is 75,000, dielectric loss tangent (tanδ) is 0.5%, solderability is good and tensile strength T is 1.4 kg. In view of the test results on the conventional capacitor, it was supposed that a semiconductive ceramic capacitor is successful of which dielectric constant is 100,000 or more, dielectric loss tangent is 1.0% or less, solderability is the same level as the conventional capacity or more, and tensile strength T is 0.5 kg or more.

Also, for comparison, tests were carried out on the conventional capacitor which has such a structure as shown in FIG. 1 or includes first conductive layers but lacks second conductive layers. The results were that the dielectric constant and dielectric loss tangent were as those of the ceramic capacitor of this example, however, soldering was completely failed and measuring of tensile strength was not possible.

As is apparent from Table 6, the ceramic capacitor indicated by Specimen Nos. 4 to 26 is non-defective and is significantly increased in dielectric constant and tensile strength as compared with the conventional capacitor. Thus, it will be noted that the example allows a ceramic capacitor to be small-sized.

Also, costs of zinc powder and copper powder used in the example are about 1/200 and 1/50 that of silver powder used in the conventional capacitor, respectively, resulting in the manufacturing cost being substantially decreased. Formation of the first and second conductive layers is carried out by screen printing or the like, accordingly, there is no fear that the ceramic body is exposed to damage such as corrosion by a plating solution sufficient to cause deterioration of reliability of the capacitor.

Thus, it will be noted that the semiconductive ceramic composition and capacitor of the example effectively exhibit the above-noted advantages of the present invention.

Also, the example revealed the following.

(a) The above-noted advantages of the example were exhibited when zinc powder having an average particle diameter of each of 5 µm, 1 µm and 30 µm was used.

(b) The above-noted advantages of the example were also exhibited when when copper powder having an average particle diameter of each of 0.1 µm, 0.3 µm, 1 µm, 5 µm and 10 µm was used.

(c) Use of various glass powders each having a softening point ranging from 330° C. to 800° C. as the glass powder for each of the zinc paste and copper paste caused the above-noted advantage of the example to be exhibited. More particularly, use of conventional frit glasses each consisting of at least two selected from the group consisting of PbO, ZnO, $Bi_2O_3$, BaO, $B_2O_3$, $SiO_2$, $ZrO_2$, $TiO_2$, $Al_2O_3$, CaO and SrO and each having a softening point ranging from 330° C. to 800° C. exhibited the same results. Such frit glasses include a PbO-$B_2O_3$ system, PbO-$B_2O_3$-$SiO_2$ system, ZnO-$B_2O_3$-$BiO_2$ system and the like.

(d) It was found that a temperature for baking the zinc paste for formation of the first conductive layer is preferably between a melting point of zinc (419.5° C.) and a boiling point thereof (930° C.), and more preferably between 500° C. and 900° C. A temperature below the melting point resulted in a failure in formation of a practical first conductive layer and a decrease in tensile strength of the layer, whereas that above the boiling point promotes oxidation of zinc sufficient to lead to an increase in electrical resistance.

(e) It was also found that a temperature for baking the copper paste for formation of the second conductive layer is preferably between 200° C. and 800° C., and more preferably between 250° C. and 500° C. A temperature below 200° C. failed in sufficient bonding between the first conductive layer and the second conductive layer to decrease tensile strength of the electrode. A temperature above 800° C. caused reduction of the surface of the semiconductive ceramic body to deteriorate characteristics of the capacitor.

EXAMPLE 3

A semiconductive ceramic composition and a semiconductive ceramic capacitor which includes electrodes formed of aluminum and copper were prepared.

(1) Preparation of Semiconductive Ceramic Composition

Example 1 was substantially repeated to obtain each composition which has a composition ratio as shown in Table 7 and 8.

TABLE 7

| Specimen No. | Composition Ratio (mol %) | | | | Electrical Characteristics | | | | |
|---|---|---|---|---|---|---|---|---|---|
| | $SrTiO_3$ | $Y_2O_3$ | $Nb_2O_5$ | MnO | Dielectric Constant $\epsilon s$ | Dielectric Loss tan δ (%) | Insulation Resistance IR (m Ω) | D.C. Breakdown Voltage Eb (V/mm) | $\epsilon s \times Eb$ (V/mm) (× $10^7$) |
| 1 | 99.90 | 0 | 0.10 | 0 | 74,000 | 0.49 | 2600 | 420 | 3.1 |
| 2 | 99.75 | 0 | 0.25 | 0 | 82,000 | 0.57 | 2600 | 410 | 3.4 |
| 3 | 99.60 | 0 | 0.40 | 0 | 96,000 | 0.60 | 2300 | 390 | 3.7 |
| 4 | 99.90 | 0.05 | 0.05 | 0 | 72,000 | 0.51 | 3600 | 560 | 4.0 |
| 5 | 99.70 | 0.05 | 0.25 | 0 | 85,000 | 0.60 | 2800 | 370 | 3.1 |
| 6 | 99.45 | 0.05 | 0.50 | 0 | 103,000 | 1.01 | 1500 | 230 | 2.4 |
| 7 | 99.90 | 0.10 | 0 | 0 | 84,000 | 0.50 | 2800 | 460 | 3.9 |
| 8 | 99.80 | 0.10 | 0.10 | 0 | 110,000 | 0.43 | 3200 | 570 | 6.3 |
| 9 | 99.65 | 0.10 | 0.25 | 0 | 129,000 | 0.51 | 2900 | 480 | 6.2 |
| 10 | 99.50 | 0.10 | 0.40 | 0 | 126,000 | 0.60 | 2700 | 420 | 5.3 |
| 11 | 99.75 | 0.25 | 0 | 0 | 74,000 | 0.57 | 2600 | 600 | 4.4 |
| 12 | 99.70 | 0.25 | 0.05 | 0 | 90,000 | 0.50 | 2700 | 570 | 5.1 |
| 13 | 99.65 | 0.25 | 0.10 | 0 | 121,000 | 0.47 | 2600 | 590 | 7.1 |
| 14 | 99.50 | 0.25 | 0.25 | 0 | 117,600 | 0.53 | 2400 | 450 | 7.9 |
| 15 | 99.49 | 0.25 | 0.25 | 0.01 | 168,000 | 0.63 | 3000 | 490 | 8.2 |
| 16 | 99.48 | 0.25 | 0.25 | 0.02 | 147,000 | 0.71 | 3900 | 530 | 7.8 |
| 17 | 99.45 | 0.25 | 0.25 | 0.05 | 128,000 | 0.78 | 4600 | 550 | 7.0 |
| 18 | 99.40 | 0.25 | 0.25 | 0.10 | 125,000 | 0.82 | 5500 | 570 | 7.1 |
| 19 | 99.30 | 0.25 | 0.25 | 0.20 | 116,000 | 1.06 | 6200 | 610 | 7.1 |
| 20 | 99.20 | 0.25 | 0.25 | 0.30 | 91,000 | 1.78 | 6700 | 720 | 6.6 |
| 21 | 99.35 | 0.25 | 0.40 | 0 | 157,000 | 0.56 | 2700 | 480 | 7.5 |
| 22 | 99.25 | 0.25 | 0.50 | 0 | 144,000 | 0.90 | 1700 | 270 | 3.9 |
| 23 | 99.90 | 0.40 | 0 | 0 | 54,000 | 0.97 | 3400 | 780 | 4.2 |
| 24 | 99.50 | 0.40 | 0.10 | 0 | 113,000 | 0.57 | 2900 | 700 | 7.9 |
| 25 | 99.35 | 0.40 | 0.25 | 0 | 154,000 | 0.51 | 3000 | 570 | 8.8 |
| 26 | 99.20 | 0.40 | 0.40 | 0 | 165,000 | 0.52 | 2600 | 510 | 8.4 |

TABLE 7-continued

| Specimen No. | Composition Ratio (mol %) | | | | Electrical Characteristics | | | | |
| | SrTiO$_3$ | Y$_2$O$_3$ | Nb$_2$O$_5$ | MnO | Dielectric Constant $\epsilon_s$ | Dielectric Loss tan $\delta$ (%) | Insulation Resistance IR (m$\Omega$) | D.C. Breakdown Voltage Eb (V/mm) | $\epsilon_s \times$ Eb (V/mm) ($\times 10^7$) |
|---|---|---|---|---|---|---|---|---|---|
| 27 | 99.45 | 0.50 | 0.05 | 0 | 44,000 | 1.51 | 5500 | 930 | 4.1 |
| 28 | 99.25 | 0.50 | 0.25 | 0 | 71,000 | 1.43 | 3700 | 610 | 4.3 |
| 29 | 99.00 | 0.50 | 0.50 | 0 | 90,000 | 1.31 | 2200 | 330 | 3.0 |

TABLE 8

| Specimen No. | Composition Ratio (mol %) | | | | | SrO/TiO$_2$ Ratio | Electrical Characteristics | | | | |
| | SrTiO$_3$ | Y$_2$O$_3$ | Nb$_2$O$_5$ | MnO | SiO$_2$ | | Dielectric Constant $\epsilon_s$ | Dielectric Loss tan $\delta$ (%) | Insulation Resistance IR (M$\Omega$) | D.C. Breakdown Voltage Eb (V/mm) | $\epsilon_s \times$ Eb (V/mm) ($\times 10^7$) |
|---|---|---|---|---|---|---|---|---|---|---|---|
| 30 | 99.45 | 0.25 | 0.25 | 0.05 | 0 | 0.998 | 151,000 | 0.81 | 1200 | 220 | 3.3 |
| 31 | 99.45 | 0.25 | 0.25 | 0.05 | 0 | 0.999 | 168,000 | 0.75 | 5000 | 520 | 8.7 |
| 32 | 99.45 | 0.25 | 0.25 | 0.05 | 0 | 1.001 | 128,000 | 0.78 | 4600 | 550 | 7.0 |
| 33 | 99.45 | 0.25 | 0.25 | 0.05 | 0 | 1.002 | 57,000 | 2.31 | 5400 | 690 | 3.9 |
| 34 | 99.445 | 0.25 | 0.25 | 0.05 | 0.005 | 0.998 | 144,000 | 0.97 | 1700 | 260 | 3.7 |
| 35 | 99.445 | 0.25 | 0.25 | 0.05 | 0.005 | 0.999 | 153,000 | 0.90 | 5000 | 570 | 8.7 |
| 36 | 99.445 | 0.25 | 0.25 | 0.05 | 0.005 | 1.001 | 166,000 | 0.84 | 4600 | 560 | 9.3 |
| 37 | 99.445 | 0.25 | 0.25 | 0.05 | 0.005 | 1.002 | 51,000 | 2.10 | 5300 | 780 | 4.0 |
| 38 | 99.44 | 0.25 | 0.25 | 0.05 | 0.01 | 0.997 | 153,000 | 0.84 | 2000 | 270 | 4.1 |
| 39 | 99.44 | 0.25 | 0.25 | 0.05 | 0.01 | 0.998 | 162,000 | 0.68 | 4900 | 550 | 8.9 |
| 40 | 99.44 | 0.25 | 0.25 | 0.05 | 0.01 | 1.002 | 163,500 | 0.59 | 5100 | 570 | 9.3 |
| 41 | 99.44 | 0.25 | 0.25 | 0.05 | 0.01 | 1.003 | 76,000 | 1.90 | 5300 | 760 | 5.8 |
| 42 | 99.40 | 0.25 | 0.25 | 0.05 | 0.05 | 0.996 | 141,000 | 0.78 | 1300 | 250 | 3.5 |
| 43 | 99.40 | 0.25 | 0.25 | 0.05 | 0.05 | 0.997 | 163,000 | 0.59 | 5300 | 540 | 8.8 |
| 44 | 99.40 | 0.25 | 0.25 | 0.05 | 0.05 | 1.003 | 160,000 | 0.60 | 5000 | 630 | 10.0 |
| 45 | 99.40 | 0.25 | 0.25 | 0.05 | 0.05 | 1.004 | 65,000 | 1.91 | 5200 | 730 | 4.7 |
| 46 | 99.35 | 0.25 | 0.25 | 0.05 | 0.10 | 0.996 | 121,000 | 0.76 | 2300 | 300 | 3.6 |
| 47 | 99.35 | 0.25 | 0.25 | 0.05 | 0.10 | 0.997 | 143,000 | 0.72 | 5300 | 640 | 9.2 |
| 48 | 99.35 | 0.25 | 0.25 | 0.05 | 0.10 | 1.003 | 144,000 | 0.63 | 5500 | 680 | 9.8 |
| 49 | 99.35 | 0.25 | 0.25 | 0.05 | 0.10 | 1.004 | 49,000 | 1.81 | 6000 | 880 | 4.3 |
| 50 | 99.25 | 0.25 | 0.25 | 0.05 | 0.20 | 0.998 | 60,000 | 0.71 | 6900 | 980 | 5.9 |
| 51 | 99.25 | 0.25 | 0.25 | 0.05 | 0.20 | 1.002 | 57,500 | 0.60 | 6500 | 940 | 5.4 |

The so-prepared each specimen had electrical characteristics as shown in Tables 7 and 8, wherein dielectric constant ($\epsilon_s$) and dielectric loss (tan $\delta$) were measured at a frequency of 1 kHz and insulation resistance was measured at a room temperature of 20° C. under the application of 50 V.

As can be seen from tables 7 and 8, the semiconductive ceramic composition of the present invention was increased in dielectric constant ($\epsilon_s$) to a level as high as about 110000 or more and highly decreased in dielectric loss (tan $\delta$) to 0.38 to 0.92%.

Also, Tables 7 and 8 indicates that addition of only one of Y$_2$O$_3$ and Nb$_2$O$_5$ as the additive for semiconductivity causes the composition to fail to be increased in dielectric constant ($\epsilon_s$) and D.C breakdown voltage (Eb) (Specimen Nos. 1, 2, 3, 7, 11 and 23). Also, addition of both Y$_2$O$_3$ and Nb$_2$O$_5$ each in an amount below 0.1 mol % failed in a significant increase in dielectric constant and D.C breakdown voltage (Specimen Nos. 4, 5, 6, 12 and 27). Further, Y$_2$O$_3$ exceeding 0.4 mol % decreased the dielectric constant (Specimen Nos. 27 to 29) and Nb$_2$O$_5$ exceeding 0.4 mol % decreased D.C breakdown voltage (Specimen Nos. 6, 22 and 29).

Furthermore, MnO below 0.02 mol % failed in a significant increase in insulation resistance IR (Specimen Nos. 14 and 15), wherein MnO exceeding 0.2 mol % caused an increase in dielectric loss and a decrease in dielectric constant (Specimen No. 20).

In addition, Table 8 indicates that addition of SiO$_2$ in an amount below 0.01 mol % causes an appropriate range of a SrO/TiO$_2$ ratio to be narrowed to 0.002 (Specimen Nos. 30–37), whereas SiO$_2$ above 0.10 mol % leaded to a decrease in dielectric constant (Specimen Nos. 50 and 51). On the contrary, SiO$_2$ in an amount of 0.01 to 0.1 mol % enlarged an appropriate range of a SrO/TiO$_2$ to 0.004 to 0.006.

(2) Formation of Semiconductive Ceramic Capacitor

A semiconductive ceramic capacitor provided with aluminum and copper electrodes was prepared using the so-prepared semiconductive ceramic body according to the following procedures.

Preparation of aluminum paste 100 parts by weight aluminum powder having an average particle diameter of 10 μm was used, and B$_2$O$_3$ (25 wt %)-SiO$_2$ (10 wt %)-ZnO (65 wt % system frit glass powder having a particle size passing through a sieve of 325 mesh was added to the aluminum powder at a mixing ratio shown in Table 9. Further, fine silver or metal oxide powder and an organic vehicle of ethyl cellulose and butyl carbitol acting as an organic binder were added thereto to form a mixture, which was then mixed while stirring to prepare an aluminum paste.

TABLE 9

| Specimen No. | Al Paste Frit* Glass | Al Paste Silver* or Metal Oxide | Al Paste Baking Temp. (°C.) | Cu Paste Frit* Glass | Cu Paste Silver* or Metal Oxide | Dielectric Constant εs | Dielectric Loss Tangent tan δ (%) | Solderability | Tensile Strength (kg) |
|---|---|---|---|---|---|---|---|---|---|
| 1 | 0 | 0 | 700 | 0 | 0 | 127,000 | 1.56 | Good | 0.9 |
| 2 | 0.5 | 0 | 700 | 0 | 0 | 129,000 | 1.50 | Good | 0.9 |
| 3 | 1.0 | 0 | 700 | 0 | 0 | 125,000 | 1.22 | Good | 1.7 |
| 4 | 5.0 | 0 | 700 | 0 | 0 | 130,000 | 0.97 | Good | 2.2 |
| 5 | 10.0 | 0 | 700 | 0 | 0 | 138,000 | 0.81 | Good | 2.4 |
| 6 | 20.0 | 0 | 700 | 0 | 0 | 151,000 | 0.71 | Good | 2.3 |
| 7 | 30.0 | 0 | 700 | 0 | 0 | 146,000 | 0.76 | Good | 2.5 |
| 8 | 20.0 | Ag:2 | 700 | 0 | 0 | 147,000 | 0.74 | Good | 2.2 |
| 9 | 20.0 | Ag:5 | 700 | 0 | 0 | 143,000 | 0.74 | Good | 2.4 |
| 10 | 20.0 | Ag:10 | 700 | 0 | 0 | 145,000 | 0.71 | Good | 2.3 |
| 11 | 20.0 | $Bi_2O_3$:2 | 700 | 0 | 0 | 148,000 | 0.85 | Good | 2.3 |
| 12 | 20.0 | $Bi_2O_3$:4 | 700 | 0 | 0 | 148,000 | 0.90 | Good | 2.4 |
| 13 | 20.0 | PbO:2 | 700 | 0 | 0 | 145,000 | 0.81 | Good | 2.2 |
| 14 | 20.0 | PbO:4 | 700 | 0 | 0 | 146,000 | 0.76 | Good | 2.4 |
| 15 | 20.0 | 0 | 700 | 1.0 | 0 | 145,000 | 0.69 | Good | 2.3 |
| 16 | 20.0 | 0 | 700 | 2.0 | 0 | 139,000 | 0.74 | Good | 2.4 |
| 17 | 20.0 | 0 | 700 | 4.0 | 0 | 144,000 | 0.71 | Good | 2.5 |
| 18 | 20.0 | 0 | 700 | 6.0 | 0 | 146,000 | 0.67 | Good | 2.4 |
| 19 | 10.0 | Ag:5 | 700 | 4.0 | 0 | 138,000 | 0.69 | Good | 2.2 |
| 20 | 10.0 | Ag:10 | 700 | 4.0 | 0 | 139,000 | 0.71 | Good | 2.1 |
| 21 | 20.0 | 0 | 700 | 0 | $Bi_2O_3$:4 | 136,000 | 0.69 | Good | 2.0 |
| 22 | 20.0 | 0 | 700 | 0 | PbO:2 | 132,000 | 0.74 | Good | 2.3 |
| 23 | 20.0 | 0 | 700 | 4.0 | $Bi_2O_3$:2 | 138,000 | 0.71 | Good | 2.3 |
| 24 | 20.0 | 0 | 700 | 4.0 | PbP:2 | 141,000 | 0.67 | Good | 2.0 |
| 25 | 20.0 | Ag:10 | 700 | 4.0 | $Bi_2O_3$:4 | 135,000 | 0.67 | Good | 2.1 |
| 26 | 20.0 | $Bi_2O_3$:4 | 700 | 4.0 | $Bi_2O_3$:4 | 138,000 | 0.69 | Good | 2.2 |

*Parts by weight

Formation of first conductive layer

First conductive layers were formed on surfaces of the semiconductive ceramic body using the aluminum paste prepared as described above. A 200 mesh screen formed of polyester synthetic resin sold under a tradename "Tetoron" was used to apply the aluminum paste onto an upper surface of the semiconductive ceramic body by printing. Then, the ceramic body was dried at 125° C. for about 10 minutes in a drying oven.

The aluminum paste was also applied onto a lower surface of the semiconductive ceramic body and dried in substantially the same manner as described above and then supplied to a batch furnace while being carried on a stainless steel wire mesh to be burned at about 900° C. for 10 minutes. A time used for the burning was about 60 minutes in all including temperature rise and fall operation. Thus, a first conductive layer mainly consisting of aluminum and having a diameter of about 7.5 mm was formed on each of both surfaces of the semiconductive ceramic body.

Preparation of copper paste 100 parts by weight copper powder having an average particle diameter of 0.5 μm was used, and $B_2O_3$ (50 wt %)PbO(50 wt %) system frit glass powder having a particle size passing through a sieve of 325 mesh was added to the copper powder at mixing ratios shown in Table 9, and further metal oxide powder and an organic vehicle consisting of ethyl cellulose and butyl carbitol and acting as an organic binder were added thereto and mixed together while stirring to prepare a copper paste.

Formation of second conductive layer

The so-prepared copper paste was applied onto each of the first conductive layers by printing and dried in substantially the same manner as in the aluminum paste described above. Then, it was burned at 360° C. for 20 minutes in a stream of a reducing atmosphere (90%$N_2$+10%$H_2$) to carry out baking, resulting in a second conductive layer which mainly consists of copper and has a diameter of about 5 mm being formed on each of the first conductive layers. Thus, a semiconductive ceramic capacitor of the present invention was prepared which comprises the semiconductive ceramic body, the first conductive layers deposited on both surfaces of the body and mainly consisting of aluminum, the second conductive layers deposited on the first conductive layers and mainly consisting of copper.

Evaluation of Electrode:

Evaluation of the electrodes of the so-obtained semiconductive ceramic capacitor was carried out in substantially the same manner as in Example 2. The results were as shown in Table 9.

As is apparent from Table 9, the ceramic capacitor indicated by Specimen Nos. 4 to 26 is non-defective and is significantly increased in dielectric constant and tensile strength as compared with the conventional capacitor. Thus, it will be noted that the example allows a ceramic capacitor to be small-sized.

Also, costs of aluminum powder and copper powder used in the example are about 1/100 and 1/50 that of silver powder used in the conventional capacitor, respectively, resulting in the manufacturing cost being substantially decreased. Formation of the first and second conductive layers is carried out by screen printing or the like, accordingly, there is no fear that the ceramic body is exposed to damage such as corrosion by a plating solution sufficient to cause deterioration of reliability of the capacitor.

Thus, it will be noted that the semiconductive ceramic composition and capacitor of this example likewise exhibit the above-noted advantages of the present invention.

Also, the example reveals the following as well as substantially the same facts indicated in items (a) to (c) and (3) of Example 2.

More particularly, it was found that a temperature for baking the aluminum paste for formation of the first conductive layer is preferably between a melting point of aluminum (660.2° C.) and a boiling point thereof (about 2060° C.), and more preferably between 800° C.

and 1200° C. A temperature below the melting point resulted in formation of a practical first conductive layer and a decrease in tensile strength of the layer, whereas that above the boiling point promotes oxidation of aluminum sufficient to lead to an increase in electrical resistance.

While the invention has been described with a certain degree of particularity with reference to the examples, obvious modifications and variations are possible in the light of the above teachings. It is therefore to be understood that within the scope of the appended claims, the invention may be practiced otherwise than as specifically described.

What is claimed is:

1. A semiconductive ceramic composition comprising:
    a base material comprising $SrTiO_3$; and
    an additive for semiconductivity comprising $Y_2O_3$ and $Nb_2O_5$;
    said $Y_2O_3$ and $Nb_2O_5$ each being present in an amount of 0.1 to 0.4 mol % based on said composition.

2. The semiconductive ceramic composition as defined in claim 1 further comprising MnO which is present in an amount of 0.02 to 0.2 mol % based on said composition.

3. The semiconductive ceramic composition as defined in claim 2 comprising $SiO_2$ which is present in an amount of 0.01 to 0.1 mol %.

4. The semiconductive ceramic composition as defined in claim 1, further comprising $SiO_2$ which is present in an amount of 0.01 to 0.1 mol %.

5. The semiconductive ceramic composition as defined in claim 1, wherein said composition is subjected to sintering to cause Bi to be present at a grain boundary of said composition.

6. A semiconductive ceramic capacitor comprising:
    (a) a semicondcutive ceramic body formed of a $SrTiO_3$ system semiconductive ceramic composition,
    (b) a first conductive layer deposited on a surface of said semicondutive ceramic body, said first conductive layer being formed of a material mainly consisting of metal powder selected from the group consisting of zinc powder and aluminum powder; and
    (c) a second conductive layer deposited on said first conductive layer, said second conductive layer being formed of a material mainly consisting of copper powder, and wherein said semiconductive ceramic composition comprises a base material comprising $SrTiO_3$ and an additive for semiconductivity comprising $Y_2O_3$ and $Nb_2O_5$, said $Y_2O_3$ and $Nb_2O_5$ each being present in an amount of 0.1 to 0.4 mole % based on said composition.

7. The semiconductive ceramic capacitor as defined in claim 6, wherein said first and second conductive layers are formed by baking.

8. The semiconductive ceramic capacitor as defined in claim 6, further comprising MnO which is present in an amount of 0.02 to 0.2 mol % based on said composition.

9. The semiconductive ceramic composition as defined in comprising $SiO_2$ which is present in an amount of 0.01 to 0.1 mol %.

10. The semiconductive ceramic capacitor as defined in claim 6, further comprising $SiO_2$ which is present in an amount of 0.0.1 to 0.1 mol %.

11. The semiconductive ceramic capacitor as defined in claim 6, wherein said composition is subjected to sintering to cause Bi to be present at a grain boundary of said composition.

12. The semiconductive ceramic capacitor as defined in claim 6, wherein said material for said first conductive layer mainly consists of zinc and further contains at least one metal of Ag, Al and Cu.

13. The semiconductive ceramic capacitor as defined in claim 12, wherein said at least one metal contained in said first conductive layer is added in the form of its simple substance.

14. The semiconductive ceramic capacitor as defined in claim 12, wherein said at least one metal contained in said first conductive layer is added in the form of its oxide.

15. The semiconductive ceramic capacitor as defined in claim 6, wherein said second conductive layer further contains metal oxide.

* * * * *